(12) United States Patent
Vaccari

(10) Patent No.: US 7,500,447 B2
(45) Date of Patent: Mar. 10, 2009

(54) FOOD DISPENSING DEVICE, IN PARTICULAR FOR AQUARIUMS

(75) Inventor: Carlo Vaccari, Castelgomberto (IT)

(73) Assignee: Ferplast SpA (IT)

( * ) Notice: Subject to any disclaimer, the term of this patent is extended or adjusted under 35 U.S.C. 154(b) by 374 days.

(21) Appl. No.: 10/596,437

(22) PCT Filed: Oct. 7, 2005

(86) PCT No.: PCT/IT2005/000584

§ 371 (c)(1),
(2), (4) Date: Jun. 13, 2006

(87) PCT Pub. No.: WO2006/040787

PCT Pub. Date: Apr. 20, 2006

(65) Prior Publication Data
US 2007/0193525 A1    Aug. 23, 2007

(30) Foreign Application Priority Data
Oct. 14, 2004   (IT)   .......................... VR2004A0160

(51) Int. Cl.
*A01K 61/02* (2006.01)
(52) U.S. Cl. ..................... 119/51.04; 119/53; 119/57.1; 119/57.92
(58) Field of Classification Search ............. 119/51.01, 119/51.02, 51.04, 51.11, 53, 56.1, 57.1, 57.92, 119/269, 212, 230, 242; 222/386, 333, 142.1, 222/142.9, 144.5
See application file for complete search history.

(56) References Cited

U.S. PATENT DOCUMENTS

| 2,798,643 | A | * | 7/1957 | Arnett et al. | ................. 222/196 |
| 3,022,767 | A | * | 2/1962 | Malek | ...................... 119/51.11 |
| 3,717,125 | A | * | 2/1973 | Sanders | .................... 119/51.11 |
| 4,949,674 | A | * | 8/1990 | Young | ...................... 119/51.04 |
| 6,082,299 | A | | 7/2000 | Halford | |

FOREIGN PATENT DOCUMENTS

| FR | 2 560 498 A1 | 9/1985 |
| GB | 2 207 331 A | 2/1989 |

\* cited by examiner

*Primary Examiner*—T. Nguyen
(74) *Attorney, Agent, or Firm*—Greenberg Traurig, LLP

(57) ABSTRACT

A device for dispensing and distributing food for aquatic fauna, which can be fitted in aquariums or containers for holding live fish, but also in tanks for turtles and terrariums in general or similar, this device comprising a tank and means for pushing the food towards an outlet, in which the tank (11) is positioned in a substantially horizontal direction and houses a pusher-mixer (12 which occupies the internal space of the tank and consists of a shaft (17), equipped with a plurality of sloping blades (18) all facing in the same direction as the direction in which the food is pushed towards the dispensing outlet (13), and in which this dispensing outlet (13) presents a substantially vertical opening for the discharge of the food in a horizontal direction.

13 Claims, 3 Drawing Sheets

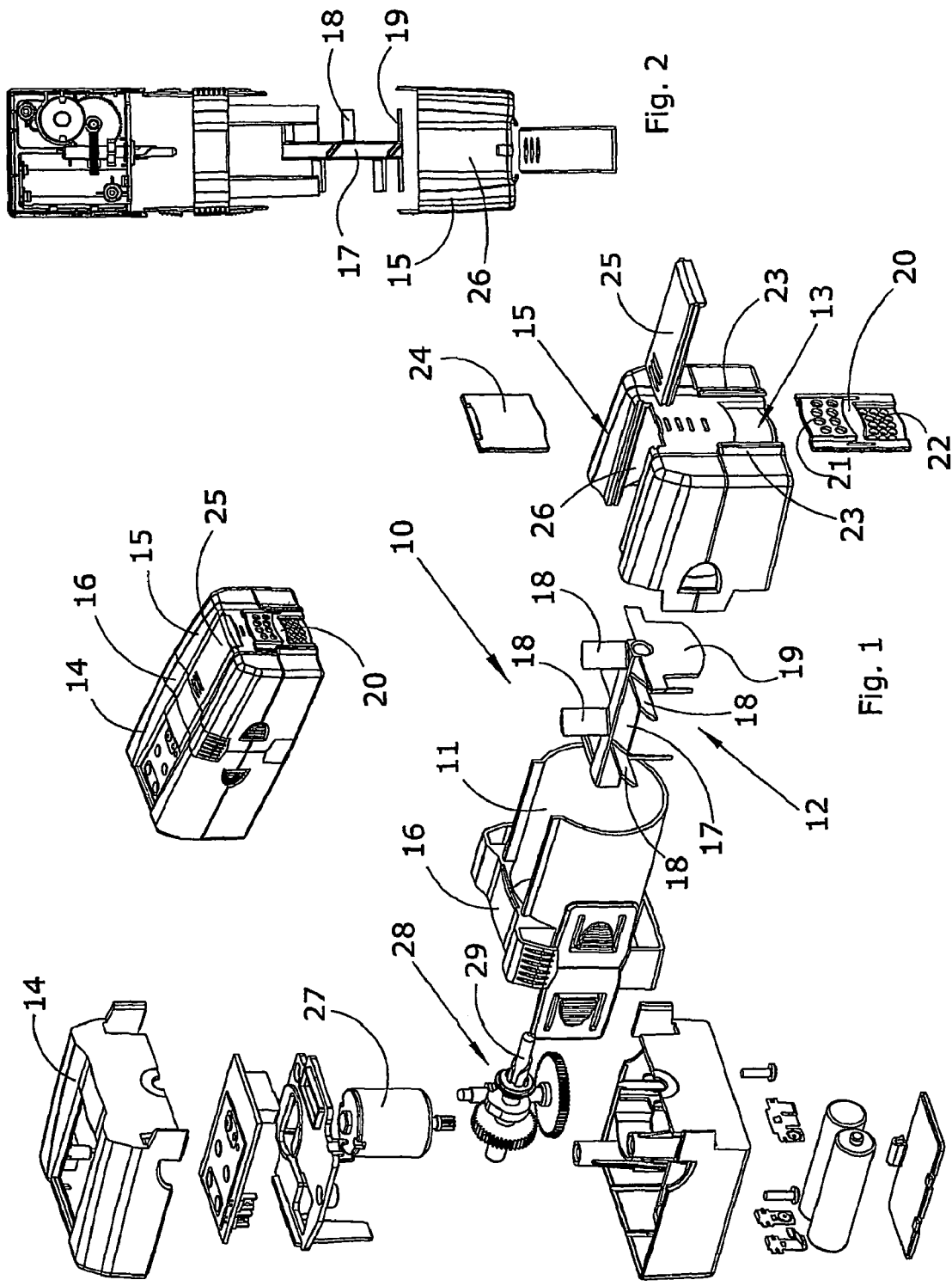

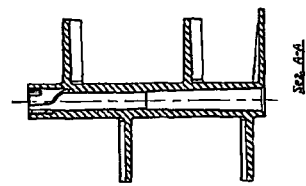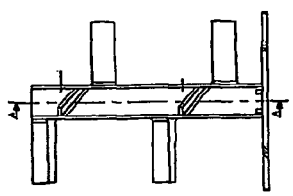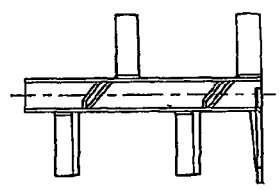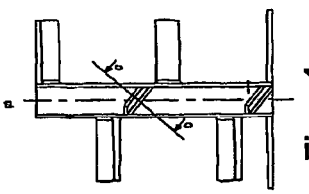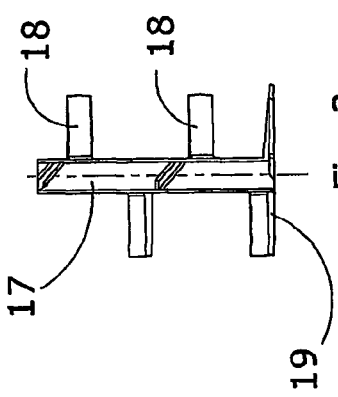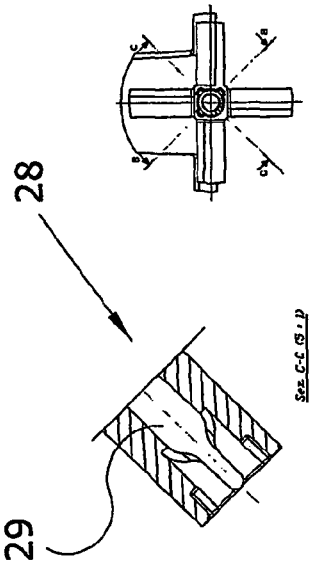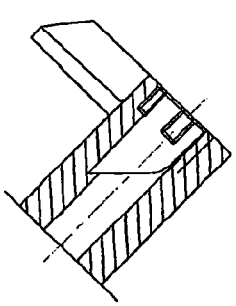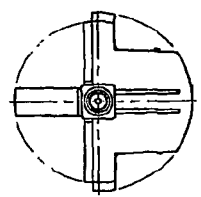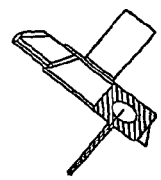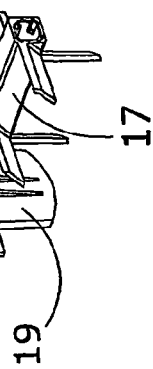

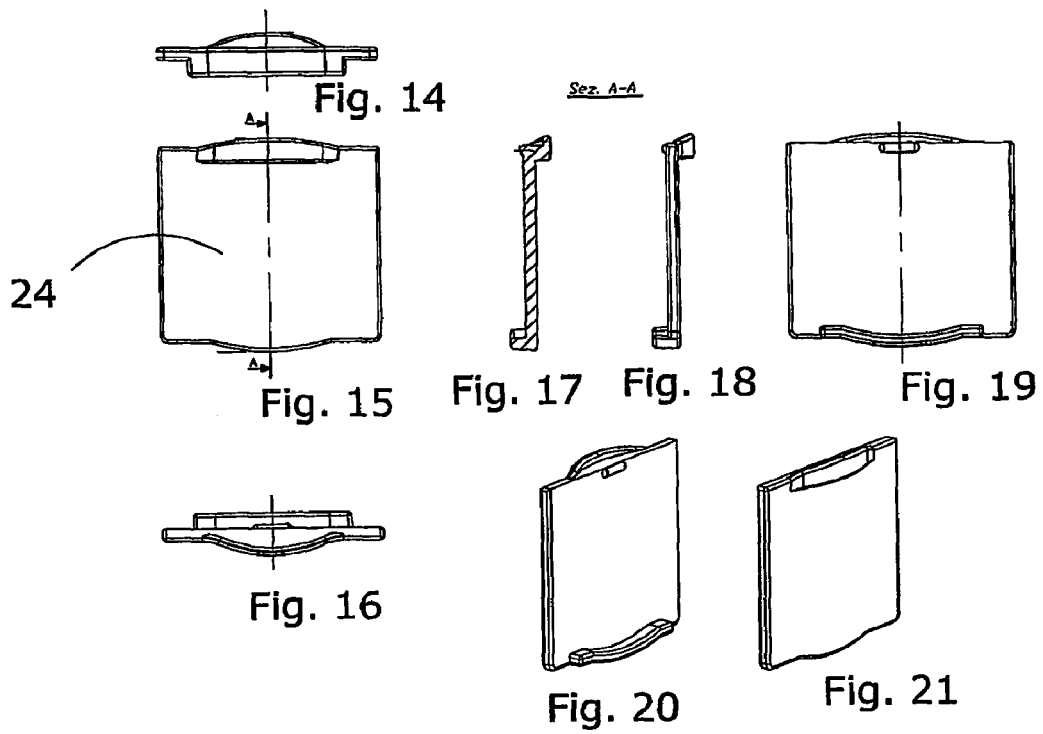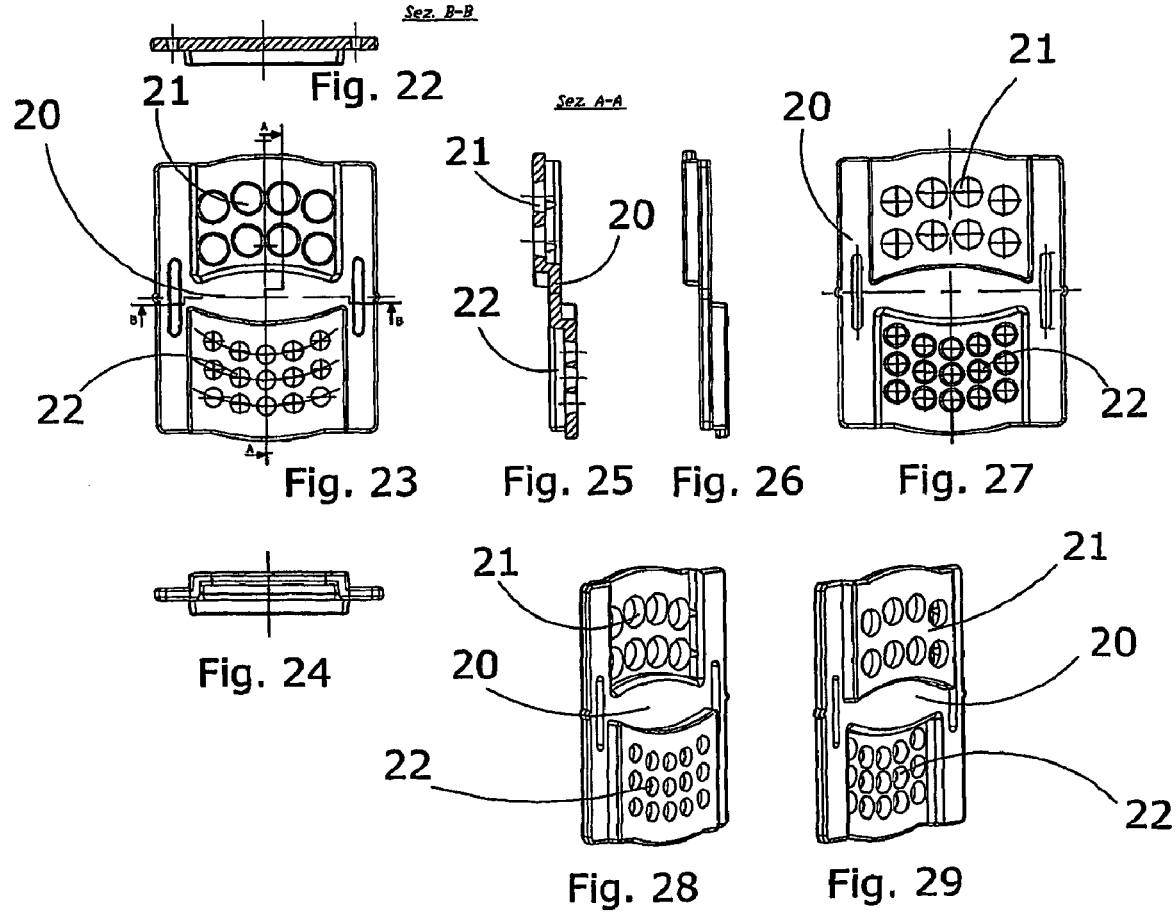

FOOD DISPENSING DEVICE, IN PARTICULAR FOR AQUARIUMS

This application is a national stage filing under 35 U.S.C. 371 of International Application PCT/IT2005/000584 filed Oct. 7, 2005 which claims priority from Italian Application No. VR2004A000160 filed Oct. 14, 2004. The entire teachings of the referenced application is incorporated herein by reference. International Application PCT/IT2004/000584 was published under PCT Article 21(2) in English.

TECHNICAL FIELD

This invention concerns a device for dispensing fish food, which can be fitted in aquariums or in containers for holding live fish.

The dispensing device in question, designed mainly for aquariums, can also be conventionally applied on tanks for other types of animals including land animals, such as tanks for turtles or terrariums in general.

The invention refers to a food dispensing device, or feeder, able to guarantee and optimize food dispensing for fish or other aquatic animals but also for land animals in the case of application on terrariums.

The invention in question offers a solution for correct food dispensing in aquariums—terrariums, making food distribution in the water more efficient.

This invention can be applied in particular in the pet product industry, with specific reference to the aquarium and terrarium sector.

BACKGROUND ART

It is known that aquariums for containing fish are equipped with automatic food dispensers, also known as feeders, that allow the product to be distributed in the water usually at periodic and preset intervals.

These automatic dispensers mainly consist of a fixed or mobile container in which the food is placed, and are equipped with means for transferring the food into the water.

In order to distribute the food product, the dispensers are generally provided with means that allow the product to be discharged from the dispenser through the use of screw feeders or other conveyors that gradually push the product at periodic intervals, allowing it to descend by gravity.

The European patent EP05 14291 and the American U.S. Pat. No. 6082299 disclose a food dispenser for aquatic fauna which comprises a protective guard enclosing transfer means consisting of a worm screw housed in a channel of the guard starting from the food in feed area and ending in the dispensing area at the discharge outlet.

In other cases, the container is cylindrical in shape and positioned horizontally so that on rotation the upper opening in the cylinder is turned downwards; causing a predetermined quantity of product to be dispensed into the water.

These solutions, which are the most commonly used in this sector, present some drawbacks, the first of which is the difficulty in dispensing exact predetermined quantities of food, so that excessive amounts may be alternated with too little amounts.

This is due on one hand to the presence of the worm screw or screw feeder which during food transfer can cause the formation of lumps especially in the presence of humidity that block the flow of the food. Similarly, in the case of the cylindrical dispenser, the rotated food can also form lumps, causing irregular dispensing.

Furthermore, the screw feeder is generally positioned below a cylindrical vertical tank, dispensing the food by moving at right angles, that is picking up the food from above and transferring it horizontally towards the discharge outlet.

This represents another factor that has a negative effect on the homogeneous delivery of the food, since its accumulation in various overlying layers in the tank creates lumpy areas due to the weight and gravity compacting condition with downward pressure.

Another factor that has a negative effect on food delivery is humidity which, especially in the case of aquariums, penetrates the dispenser or even the food tank, leading even more to the formation of lumps of food, which notoriously represent the main obstacle in the correct dispensing of the food product.

The possibility of the humidity penetrating the dispenser and affecting the food is due to the fact that the devices are not equipped with closing elements at the product outlet, so that the food is constantly in contact with air saturated with humidity from the water below.

This causes all the imaginable consequences, including the formation of mould and of food lumps that block the outlets, sometimes even causing complete blockage of the dispenser.

DESCRIPTION OF THE INVENTION

This invention proposes to provide a food dispenser for aquariums or terrariums which is able to eliminate or at least reduce the drawbacks described above.

The invention also proposes to provide a food dispenser for aquariums which is easy to produce in order to be economically advantageous.

This is achieved by means of a food dispenser whose features are described in the main claim.

The dependent claims of the food dispenser describe advantageous embodiments of the invention.

The main advantages of this solution, in addition to those deriving from its construction simplicity, concern first of all a greater ability to dispense food in aquariums and terrariums, due to the presence of a particularly shaped screw feeder and of closing elements positioned at the outlet.

Another important advantage proposed by this invention concerns the construction setup of the dispenser, the substantially cylindrically shaped tank being positioned horizontally and the screw feeder it contains having a dual function: it allows delivery of the product into the aquarium and also permits continuous mixing of the food product since it takes up practically all the internal volume of the tank.

The food dispenser for aquatic fauna according to the invention therefore substantially consists of a more or less cylindrical tank with a horizontal axis, containing a sector type screw feeder formed by a shaft which also has a horizontal axis and equipped with a plurality of blades sloping in the same direction as the product in feed direction.

The particular shape of the screw feeder and its positioning inside the horizontal cylindrical container mean that the food product can be kept in the best organoleptic conditions, preventing any formation of compacted food areas or lumps, since the screw feeder mixes the product at least every time food is dispensed.

The dispenser according to the invention also comprises an outlet which is open horizontally on the front of the device and not at the bottom, and works in conjunction with a plate at the end of the mixer-dispenser.

This plate on the mixer keeps the outlet closed when the dispenser is not operating, opening it only when the product is dispensed, thus preventing the entry of any humidity from the water below.

The horizontal opening of the dispenser outlet and the possibility of closing the outlet by means of the blade on the dispenser device are two factors that prevent the entry of humidity in the cylinder containing the food product, with all the consequent advantages for the preservation and integrity of the product.

A further advantage is the possibility of fitting a multipurpose dispenser which can dose the product according to its characteristics, for example on the basis of its consistency, which can be in flakes, fine or coarse grains.

DESCRIPTION OF THE DRAWINGS

Other features and advantages of the invention sill become evident on reading the following description of one embodiment of the invention, given as a non-binding example, with the help of the accompanying drawings in which:

FIG. 1 is a schematic exploded view of the complete dispenser according to the invention;

FIG. 2 shows a schematic plan view;

FIGS. 3 to 13 are schematic views of the mixer-pusher and its means of coupling to the tank;

FIGS. 14 to 21 represent schematic views of the front closing cover in correspondence with the dispensing outlet and which can be partially or totally opened for dispensing of flake type products;

FIGS. 22 to 29 are schematic views of the perforated dispensing element positioned in correspondence with the dispensing outlet and which can be used in the case of granular products.

DESCRIPTION OF ONE EMBODIMENT OF THE INVENTION

The food product dispenser according to the invention, indicated in general with 10, consists substantially of a tank 11 or food containing body, housing a mixing and conveying element 12 which mixes and pushes the food towards the vertical outlet 13 allowing horizontal delivery of the food.

According to a preferred embodiment, the body of the tank 11 is made from plastic material, transparent or opaque, and is positioned, as can be seen in FIG. 1, in a substantially horizontal direction.

The tank 11 is the fixed type and its shape allows it to be positioned between two casings 14 and 15 opposite to each and specular with respect to the cylinder coupling area 16.

The casing 14 is designed to contain the parts driving the pusher 12, while the casing 15 houses the tank 11 and the pusher-mixer 12 and terminates, at its front end, with an outlet 13 equipped with closing means.

The pusher-mixer 12 consists of a shaft 17 fitted with a plurality of blades 18 which all slope in the same direction as the pushing direction of the food towards the outlet 13 and the rotation direction of the shaft on which they are fixed.

According to the solution shown in FIGS. 1 to 12, the sloping blades of the screw feeder are substantially rectangular in shape while the shaft on which they are fixed has a square cross-section, but any other shape of blade and shaft can be used without altering the inventive concept.

The end of the shaft facing the outlet is also equipped with a plate 19 positioned at right angles to the shaft 17 and occupying one of the two half-sections defined by the center line of the shaft 17.

In particular, the plate 19, which represents a closing element, faces downwards with respect to the center line of the screw feeder when this is in the stationary or idle position.

The plate 19 is functionally connected with the dispensing outlet 13 and depending on its position, controlled by rotation of the shaft 17, allows or prevents food discharge.

In fact, as can be seen in FIG. 1, the plate 19 is aligned with the outlet 13, so that when the screw feeder is stationary the plate is positioned in the lower center line of the shaft and completely closes the outlet 13, preventing the exit of food and the entry of humidity from below, while when the shaft is rotated the plate 19 moves away from the outlet 13 allowing the food to be dispensed.

The outlet 13 can be fitted with a reversible perforated doser 20 which has two sections 21 and 22 with different sized holes. This perforated doser, which is used for dispensing granular products, can be inverted according to the fine or rough granulometry of the food product to be dosed.

The perforated doser 20 is inserted one way up or the other between the two guides 23 positioned at the sides of the outlet 13, thus occupying the space and allowing controlled dispensing of the food.

As an alternative to the perforated doser 20 a sliding cover 24 can be used for dispensing flake type products.

For this purpose, the cover 24, which slides in the same guides 23, can be moved to control the opening of the outlet 13 according to the amount of food to be dispensed into the aquarium.

Above the outlet 13, the casing 15 also comprises another sliding cover 25 which in this cases closes an opening 26 in the upper part of the casing and which allows the product to be inserted in the fixed tank 11 and the product level in the tank to be checked.

Finally, the shaft 17 is driven by an electric type motor 27, housed in the casing 14. The motor rotates a kinematic drive unit 28 which drives the power take-off 29 engaged on the end of the shaft 17 opposite the end where the plate 19 is attached.

The power take-off 29 is appropriately shaped to couple with the respective end of the shaft 17.

The power take-off 29 is in fact shaped to maintain a direct grip with the shaft 17, allowing control of the position of the mixer-dispenser 12, and thus of the plate 19, according to the revolutions of the shaft implemented by the drive unit 28.

This allows the outlet 13 to be kept closed between one discharge of food and the next and to open in the dispensing stages.

The shape of the power take-off 29 can thus be the restrained quick-coupling type or a bayonet coupling, or with ant snap-fit coupling shape according to requirements.

As can be seen, this device allows the food for the aquatic fauna in the aquarium to be constantly maintained in the best organoleptic conditions.

In fact, the blades 18 of the pusher-mixer 12 have the dual purpose of pushing the food towards the outlet 13 and at the same time mixing it completely inside the tank 11, so as to keep it fresh and fragrant, while the plate 19 prevents the entry of humidity and the formation of lumps due to the humidity, which has notoriously always represented a problem in the correct functioning of automatic food dispensers.

This ability to keep the food dry and mixed, thus always fragrant and ready for use, is further guaranteed by the type of dispensing outlet which, being arranged according to a horizontal delivery, allows the food to be discharged horizontally rather than vertically, providing even better protection against humidity rising from the water in the aquarium.

In addition, the dispensing device in question, designed mainly for aquariums, can also be fitted in tanks for other types of animals, including land animals, such as tanks for turtles or terrariums in general.

The invention is described above with reference to a preferred embodiment. It is nevertheless clear that the invention is susceptible to numerous variations that lie within its scope, within the framework of technical equivalents.

The invention claimed is:

1. A device for dispensing and distributing food for aquatic fauna, which can be fitted in aquariums or containers for holding live fish, as well as in tanks for turtles and terrariums in general or similar, said device comprising:
   a tank for containing the food, the tank being positioned in a substantially horizontal direction; and
   a pusher-mixer for pushing the food towards a dispensing outlet, the pusher-mixer occupying the internal space of the tank and comprising a shaft equipped with a plurality of sloping blades all facing in the same direction as the direction in which the food is pushed towards, the shaft further including a closing plate at an end of the shaft closer to the dispensing outlet, the closing plate positioned at right angles to the shaft and occupying one of two half-sections defined by a center line of the shaft, wherein the closing plate faces downwards with respect to the center line of the shaft when the pusher-mixer is in a stationary or idle position;
   wherein the dispensing outlet has a substantially vertical opening for the discharge of the food in a horizontal direction.

2. The device of claim 1, wherein the plate of the shaft is functionally connected with the opening of the outlet and wherein rotation of the shaft determines the position of the plate to allow or prevent food dispensing and minimize the entry of humidity.

3. The device of claim 1, wherein the outlet is equipped with a reversible perforated dispenser which has two sections with different sized holes.

4. The device of claim 3, wherein said perforated dispenser, according to the grain size of the food product to be dispensed, is positioned in one of two vertical positions where one of the two sections occupies the dispensing outlet.

5. The device of claim 3, wherein the perforated dispenser is inserted in one of two vertical positions between two guides to occupy the dispensing outlet and allow controlled discharge of the food, said two guides are each positioned at a side of the dispensing outlet.

6. The device of claim 1, further comprising a sliding cover for dosing flake type products.

7. The device of claim 6, wherein said sliding cover which slides between a pair of guides, can be moved to regulate the opening of the outlet according to the amount of product to be dispensed into the aquarium.

8. The device of claim 1 wherein the shaft is driven by an electric motor housed in a casing, said motor rotating a kinematic drive unit which drives a power take-off engaged on an end of the shaft opposite the end fitted with the plate.

9. The device of claim 8, wherein the power take-off is shaped so as to maintain a direct grip with the shaft allowing control of the position of the mixer-dispenser, and thus of the plate according to the revolutions of the shaft determined by the drive unit.

10. The device of claim 1, wherein the tank is fixed and shaped so as to be held, together with motor parts for driving the pusher-mixer between two casings opposite to each other and having substantially similar exterior dimensions.

11. The device of claim 10, wherein one of said casings is designed to contain the parts driving the pusher-mixer while the other casing houses the tank and the pusher-mixer and terminates, at its front end, with an outlet equipped with closing means.

12. A device for dispensing and distributing food for aquatic fauna, which can be fitted in aquariums or containers for holding live fish, as well as in tanks for turtles and terrariums in general or similar, said device comprising:
   a tank for containing the food, the tank being positioned in a substantially horizontal direction;
   a pusher-mixer for pushing the food towards a dispensing outlet, the pusher-mixer occupying the internal space of the tank and comprising a shaft equipped with a plurality of sloping blades all facing in the same direction as the direction in which the food is pushed towards;
   motor parts for driving the pusher-mixing; and
   two casings housing the tank and the motors parts between the two casings, the two casings opposite each other and having substantially similar exterior dimensions;
   wherein the dispensing outlet has a substantially vertical opening for the discharge of the food in a horizontal direction.

13. The device of claim 12, wherein one of said casings is designed to contain the parts driving the pusher-mixer while the other casing houses the tank and the pusher-mixer and terminates, at its front end, with an outlet equipped with closing means.

* * * * *